United States Patent
Liang

(10) Patent No.: US 9,255,602 B2
(45) Date of Patent: Feb. 9, 2016

(54) SYSTEMS AND METHODS FOR A LOCKING DOUBLE CARABINEER

(71) Applicant: Nite Ize, Inc., Boulder, CO (US)

(72) Inventor: Robin Liang, Yangjiang (CN)

(73) Assignee: NITE IZE, INC., Boulder, CO (US)

(*) Notice: Subject to any disclaimer, the term of this patent is extended or adjusted under 35 U.S.C. 154(b) by 198 days.

(21) Appl. No.: 13/786,855

(22) Filed: Mar. 6, 2013

(65) Prior Publication Data

US 2013/0232741 A1 Sep. 12, 2013

Related U.S. Application Data

(60) Provisional application No. 61/749,299, filed on Jan. 5, 2013.

(30) Foreign Application Priority Data

Mar. 7, 2012 (CN) .................. 2012 2 0083757 U

(51) Int. Cl.
*F16B 45/00* (2006.01)
*F16B 45/06* (2006.01)
*F16B 45/02* (2006.01)

(52) U.S. Cl.
CPC ............. *F16B 45/06* (2013.01); *F16B 45/02* (2013.01); *Y10T 24/45372* (2015.01); *Y10T 29/49* (2015.01)

(58) Field of Classification Search
CPC ..... F16B 45/02; B66C 1/36; Y10T 24/45361; Y10T 24/45335; Y10T 24/45288
USPC ............ 24/600.2, 599.5, 599.9, 600.1, 601.1, 24/598.3, 600.8
See application file for complete search history.

(56) References Cited

U.S. PATENT DOCUMENTS

| 437,380 | A | | 9/1890 | Lundborg |
|---|---|---|---|---|
| 1,025,666 | A | * | 5/1912 | Yeagle ........................ 24/599.4 |
| 1,114,289 | A | * | 10/1914 | Rittenhouse ..................... 59/85 |
| 1,165,606 | A | * | 12/1915 | King ............................ 24/599.9 |
| 1,287,825 | A | * | 12/1918 | Ballou, Jr. .................... 24/599.4 |
| 2,064,133 | A | | 12/1936 | Von Schroeder |
| 2,492,991 | A | * | 1/1950 | Hanna ......................... 24/599.6 |
| 3,331,109 | A | * | 7/1967 | MacMillan et al. ....... 294/82.21 |
| 3,630,475 | A | | 12/1971 | Barry |
| D244,910 | S | | 7/1977 | Chasen et al. |
| D271,465 | S | | 11/1983 | Boissonnet |

(Continued)

FOREIGN PATENT DOCUMENTS

| CN | 202456777 U | 10/2012 |
|---|---|---|
| DE | 202004003908 U1 | 5/2004 |

*Primary Examiner* — Robert J Sandy
*Assistant Examiner* — Matthew Sullivan
(74) *Attorney, Agent, or Firm* — Haynes and Boone, LLP

(57) ABSTRACT

An apparatus for attaching items includes a body and a first and second hook oriented on a first and second side of the body. The apparatus further includes a first and second gate, the first gate attached to the body and oriented to close the first hook, and the second gate attached to the body and oriented to close the second hook. The apparatus further includes a first and second sliding lock, the first and second sliding locks oriented on the first and second gates, respectively, the first and second sliding locks having a first position, the first position being a locked position where the sliding lock is positioned in a first and second notch in the body, and a second position, the second position being an unlocked position where the first and second sliding locks are distal from the first and second notches.

5 Claims, 3 Drawing Sheets

(56) References Cited

U.S. PATENT DOCUMENTS

| | | |
|---|---|---|
| D271,466 S | 11/1983 | Boissonnet |
| D273,273 S | 4/1984 | Faidide |
| D282,904 S | 3/1986 | Faidide |
| D292,385 S | 10/1987 | Udelhofen |
| D323,104 S | 1/1992 | Russell et al. |
| 5,384,943 A | 1/1995 | LeFebvre et al. |
| D407,297 S | 3/1999 | Mihailovic |
| D425,781 S | 5/2000 | Hopper |
| D448,655 S | 10/2001 | Lai |
| 6,336,260 B1 * | 1/2002 | Mauthner .................... 24/376 |
| D466,791 S | 12/2002 | Kelleghan |
| D468,997 S | 1/2003 | Chang |
| D475,605 S | 6/2003 | Kelleghan |
| D493,092 S | 7/2004 | Kalat |
| D508,525 S | 8/2005 | Goldberg |
| D521,362 S | 5/2006 | Kelleghan |
| D528,238 S | 9/2006 | Kramer |
| 7,214,171 B2 | 5/2007 | Thelen et al. |
| D577,574 S | 9/2008 | Liang |
| D594,738 S | 6/2009 | Kelleghan |
| D603,293 S | 11/2009 | Merriam-Smith |
| D607,712 S | 1/2010 | Kelleghan |
| D612,710 S | 3/2010 | Kelleghan |
| D626,393 S | 11/2010 | Ormsbee |
| D631,332 S | 1/2011 | Bauer et al. |
| D631,333 S | 1/2011 | Bauer et al. |
| D637,473 S | 5/2011 | Mitchell |
| D646,556 S * | 10/2011 | Kelleghan ..................... D8/356 |
| 8,151,419 B2 | 4/2012 | Rolain et al. |
| D665,655 S | 8/2012 | Ishii |
| D669,764 S | 10/2012 | Kelleghan |
| D670,555 S | 11/2012 | Lin |
| D684,845 S | 6/2013 | Wood |
| D686,058 S | 7/2013 | Paik et al. |
| D688,118 S | 8/2013 | Hobson |
| D698,626 S * | 2/2014 | Ormsbee et al. ............... D8/356 |
| 2002/0050032 A1 * | 5/2002 | Carnall ..................... 24/600.2 |
| 2005/0087662 A1 | 4/2005 | Jacobs |
| 2005/0193533 A1 * | 9/2005 | Chang ....................... 24/601.4 |
| 2007/0119891 A1 | 5/2007 | Lawrence |
| 2009/0000086 A1 * | 1/2009 | Bing ......................... 24/592.11 |

* cited by examiner

SYSTEMS AND METHODS FOR A LOCKING DOUBLE CARABINEER

CROSS-REFERENCE TO RELATED APPLICATIONS

This application claims the benefit of U.S. Provisional Application No. 61/749,299 filed Jan. 5, 2013, and CN Patent Application No. 201220083757.8 filed Mar. 7, 2012. These applications are hereby incorporated by reference to the same extent as though fully contained herein.

BACKGROUND

Carabineers find usage in many situations for securely hanging objects from a variety of attachment points. At times, the gate on a carabineer may be dislodged by occurrences during movement and may result in the opening of the gate and the detachment of the carabineer. This detachment is undesirable.

SUMMARY

In one embodiment, an apparatus for attaching items includes a body and a first and second hook oriented on a first and second side of the body. The apparatus further includes a first and second gate, the first gate attached to the body and oriented to close the first hook, and the second gate attached to the body and oriented to close the second hook. The apparatus further includes a first and second sliding lock, the first and second sliding locks oriented on the first and second gates, respectively, the first and second sliding locks having a first position, the first position being a locked position where the sliding lock is positioned in a first and second notch in the body, and a second position, the second position being an unlocked position where the first and second sliding locks are distal from the first and second notches. Optionally, the first and second notches are proximate to a first and second pivot point of the first and second gates, respectively. In one configuration, the body has an s-like shape, the first and second hooks forming the s-like shape.

In another embodiment, a double carabineer includes a carabineer body, the carabineer body having a first and second hook, the first and second hooks having a first and second opening, respectively. The double carabineer further includes a first and second gate, the first and second gates interconnected with the carabineer body, such that the first gate closes the first opening and the second gate closes the second opening. The double carabineer further includes a first and second slide, the first and second slides configured to slide up and down the first and second gates, respectively.

In another embodiment, a locking carabineer includes a carabineer body having a first hook, the first hook having a first opening. The locking carabineer further includes a first gate interconnected with the carabineer body, such that the first gate closes the first opening. The locking carabineer further includes a first slide configured to slide up and down the first gate, the first slide having a first and second position in relation to the carabineer body, the first position locking the first gate and the second position unlocking the first gate. Optionally, the carabineer body has a first notch, proximate to where the first gate is interconnected with the carabineer body, the first notch sized to receive the first slide when the first slide is in the first position. In one embodiment, the first slide prevents the first gate from rotating to an open position by pressing against the first notch. In another embodiment, the carabineer body includes a second hook, the second hook having a second opening, and further includes a second gate interconnected with the carabineer body, such that the second gate closes the first opening and a second slide configured to slide up and down the second gate, the second slide having a third and fourth position in relation to the carabineer body, the third position locking the second gate and the fourth position unlocking the second gate. In one alternative, the carabineer body has a first notch, proximate to where the first gate is interconnected with the carabineer body, the first notch sized to receive the first slide when the first slide is in the first position, and the first slide prevents the first gate from rotating to an open position by pressing against the first notch. In another alternative, the first and second hooks form an s-shape in the carabineer body. Optionally, the first and second gates are wireframe gates, and the wireframe gates include a the first and second slide, and each include a tab, the tab sized to fit inside the wireframe to prevent the first and second gates from sliding off an end of the wireframe gates. Alternatively, the first and second slides have an approximately oval shape around the wireframe gates. Optionally, the first and second slides each have a notch configured to allow removal of the first and second slides. In another alternative, the first and second slides each have a first and second opening at each end, and the first and second slides narrow gradually from the first and second openings, such that the narrowing at the second opening prevents the first and second slides from sliding off of the first and second carabineer gates, respectively.

In one embodiment, a method of using a locking double carabineer includes providing a locking double carabineer having a slide on each of a first and second gate; sliding the slide on the first gate from a first locked position to a second unlocked position; and opening the first gate. Optionally, the method further includes closing the first gate sliding the slide on the first gate from the second unlocked position to the first locked position, wherein the first gate is locked. In another embodiment, the first locked position positions the slide of the first gate in a notch in a body of the double locking carabineer, the slide preventing the first gate from opening when the slide is in the notch. Optionally, the notch is located near an interconnection point of the first gate with the body of the double carabineer. In another alternative, the body includes a first and second hook, and the first and second hooks form an s-shape in the carabineer body. Optionally, the first and second gates are wireframe gates, and the wireframe gates include a the first and second slide, and each include a tab, the tab sized to fit inside the wireframe to prevent the first and second gates from sliding off an end of the wireframe gates.

BRIEF DESCRIPTION OF THE DRAWINGS

FIG. 4b shows a cross-section of the lock portion of FIG. 4a; and

DETAILED DESCRIPTION OF THE DRAWINGS

Figure 1:
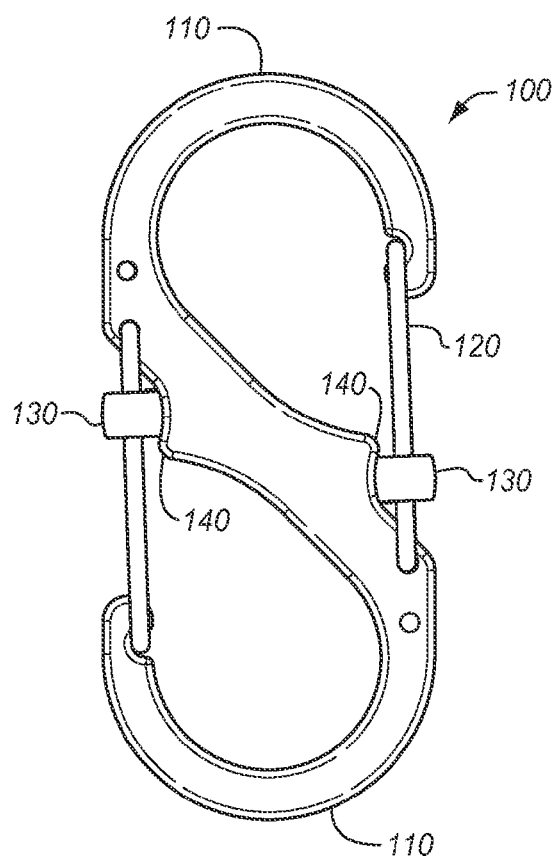
FIG. 1 shows a front view of one embodiment of a locking double carabineer.

Various systems and methods are included in a locking double carabineer. FIG. 1 shows one embodiment of a locking double carabineer (LDC) 100. LDC 100 includes a top and bottom hook 110. Gates 120 are oriented to close over each hook 110. Sliding lock 130 provides for the locking of the gates 120 of the LDC 100 by sliding to a locking position in notch 140. As is clear from the figure, sliding lock 130 braces the gates 120 of the LDC 100. Therefore, even when pressure is applied to the gates 120, they will not open. The sliding lock 130 may slide up and down the gate 120.

Figure 2:
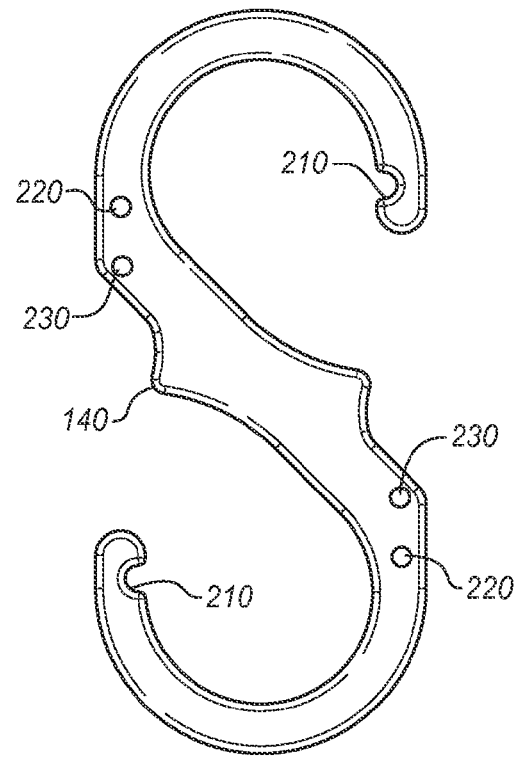
FIG. 2 shows a front view of the hook portion of the locking double carabineer of FIG. 1.

FIG. 2 shows the hook 110 portions of the LDC 100 with the additional hardware removed. The hook portion includes gate apertures 220, 230 and gate notches 210.

Figure 3:
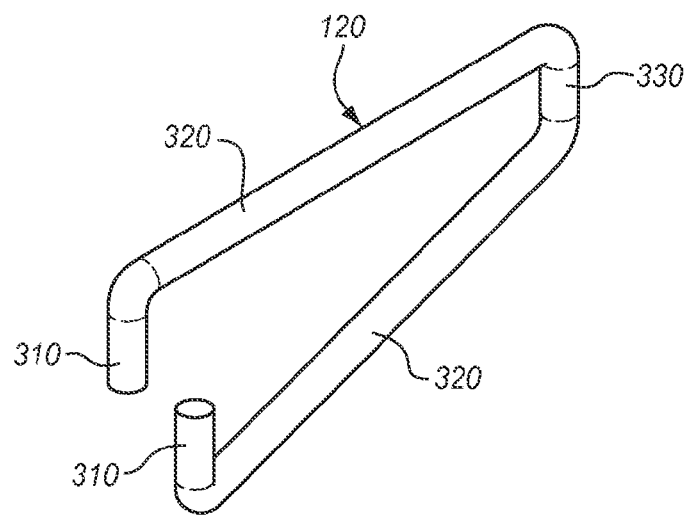
FIG. 3 shows the gate portion of the locking double carabineer of FIG. 1.

FIG. 3 shows gate 120. Gate 120 includes pegs 310, angled portion 330, and arms 320.

Figure 4A:
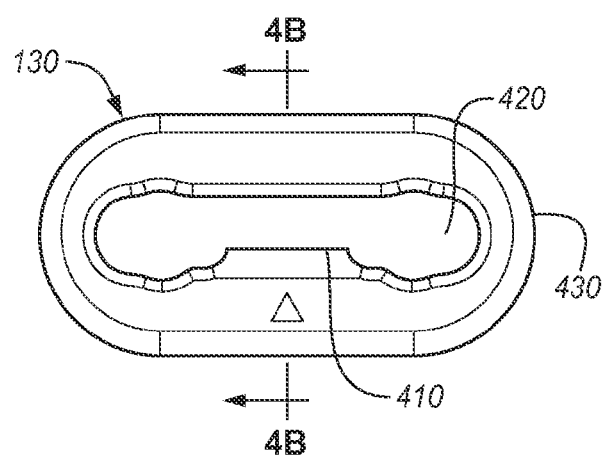
FIG. 4a shows the lock portion of the locking double carabineer of FIG. 1.
Figure 4B:
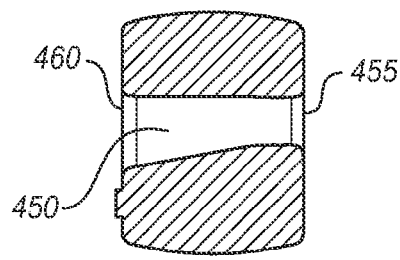

FIG. 4a shows the sliding lock 130. The sliding lock 130 includes an aperture for receiving the gate 120, an outer body 430, and tab 410, which prevents the sliding lock 130 from sliding off of the gate 120. This reduced area of thickness is visible in FIG. 4b at end 455. The dimensions of end 460 and space 450 are such that they may accommodate and easily slide over the gate 120, while the tab 410 makes end 455 too thin to pass over the end of the gate 120.

Figure 5A:
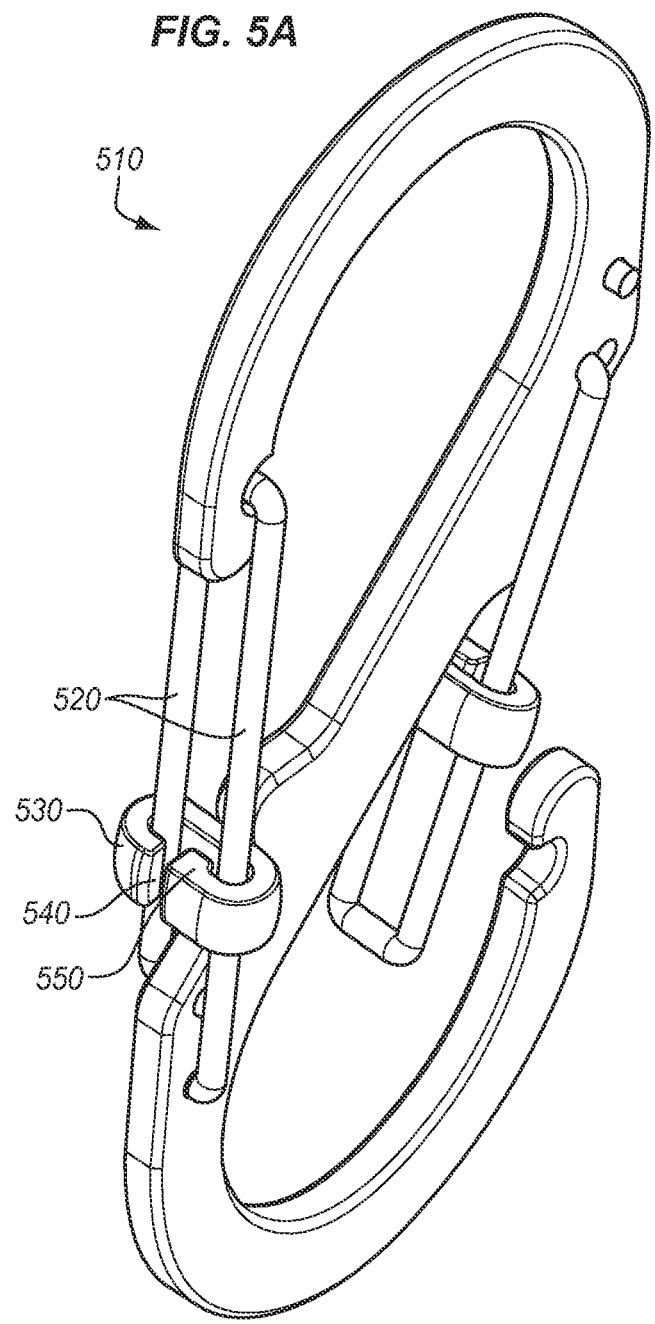
FIGS. 5a and 5b show another embodiment of a locking double carabineer.
Figure 5B:
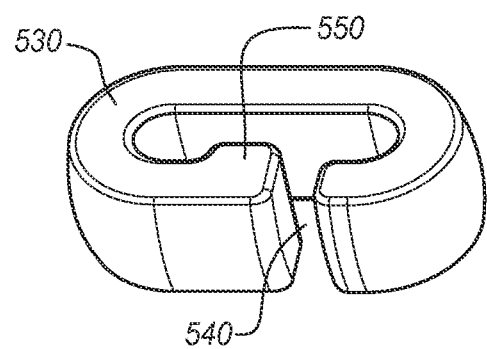

FIGS. 5a and 5b show an alternative embodiment of a locking double carabineer 510. In this embodiment, an alternative sliding lock 530 is shown. Like the previous sliding lock 130, this sliding lock 530 serves to lock the gate 520 of the carabineer 510. The sliding lock 530 is more easily removed from the gate 520. Sliding lock 530 has an open g-like shape with opening 540 and tab 550. As above in reference to tab 410, tab 550 prevents the sliding lock 530 from sliding off the end of the carabineer 510. The opening 540 allows for the sliding lock 530 to be bent and removed and put on the gate 520.

The previous detailed description is of a small number of embodiments for implementing the systems and methods for a locking double carbineer and is not intended to be limiting in scope. The following claims set forth a number of the embodiments of the systems and methods of a locking double carabineer disclosed with greater particularity.

What is claimed:

1. A locking carabineer comprising:
   a carabineer body having a first hook and a second hook, the first hook having a first opening and the second hook having a second opening;
   a first gate interconnected with the carabineer body, such that the first gate closes the first opening;
   a first slide configured to slide up and down the first gate, the first slide having a first position and a second position in relation to the carabineer body, the first position locking the first gate and the second position unlocking the first gate, wherein the carabineer body has a first notch, proximate to where the first gate is interconnected with the carabineer body, the first notch sized to receive the first slide when the first slide is in the first position, wherein the first slide prevents the first gate from rotating to an open position by pressing against the first notch;
   a second gate interconnected with the carabineer body, such that the second gate closes the first opening; and
   a second slide configured to slide up and down the second gate, the second slide having a third position and a fourth position in relation to the carabineer body, the third position locking the second gate and the fourth position unlocking the second gate wherein the carabineer body has a first notch, proximate to where the first gate is interconnected with the carabineer body, the first notch sized to receive the first slide when the first slide is in the first position and the first slide prevents the first gate from rotating to an open position by pressing against the first notch, the first and second hooks form an s-shape in the carabineer body, the first and second gates are wireframe gates, and the wireframe gates include a first slide and a second slide, and each include a tab, the tab sized to fit inside the wireframe gates to prevent the first and second gates from sliding off an end of the wireframe gates.

2. The locking carabineer of claim 1, wherein the first and second slides have an approximately oval shape around the wireframe gates.

3. The locking carabineer of claim 2, wherein the first and second slides each have a notch configured to allow removal of the first and second slides.

4. The locking carabineer of claim 2, wherein the first and second slides each have a first opening and a second opening at each end, and the first and second slides narrow gradually from the first and second openings, such that the narrowing at the second opening prevents the first and second slides from sliding off of the first and second carabineer gates, respectively.

5. A method of using a locking double carabineer, the method comprising:
   providing a locking double carabineer having a slide on each of a first gate and a second gate;
   sliding the slide on the first gate from a first locked position to a second unlocked position;
   opening the first gate;
   closing the first gate; and
   sliding the slide on the first gate from the second unlocked position to the first locked position, wherein the first gate is locked, wherein the first locked position positions the slide of the first gate in a notch in a body of the double locking carabineer, the slide preventing the first gate from opening when the slide is in the notch, and the notch is located near an interconnection point of the first gate with the body of the double carabineer, wherein the body includes a first hook and a second hook, the first and second hooks form an s-shape in the carabineer body, the first and second gates are wireframe gates, and the wireframe gates include a first slide and a second slide, and each include a tab, the tab sized to fit inside the wireframe gates to prevent the first and second gates from sliding off an end of the wireframe gates.

\* \* \* \* \*